United States Patent [19]

Underwood

[11] Patent Number: 4,519,848
[45] Date of Patent: May 28, 1985

[54] SEPARATOR

[76] Inventor: Gene E. Underwood, P.O. Box 2685, Conroe, Tex. 77305

[21] Appl. No.: 608,262

[22] Filed: May 8, 1984

Related U.S. Application Data

[63] Continuation of Ser. No. 387,503, Jun. 11, 1982, abandoned.

[51] Int. Cl.³ .............................................. B08B 3/00
[52] U.S. Cl. .................................... 134/34; 134/182; 210/788; 210/512.1
[58] Field of Search .............................. 210/787–789, 210/201, 202, 205, 207, 209, 512.1; 134/40, 182, 186, 34, 198

[56] References Cited

U.S. PATENT DOCUMENTS

| | | | |
|---|---|---|---|
| 3,868,321 | 2/1975 | Gough | 210/512.1 X |
| 3,958,947 | 5/1976 | Robinson et al. | 134/34 X |
| 4,094,783 | 6/1978 | Jackson | 210/512.1 X |
| 4,211,643 | 7/1980 | Frykhult et al. | 210/512.1 X |

Primary Examiner—Thomas Wyse
Attorney, Agent, or Firm—Arthur F. Zobal

[57] ABSTRACT

A separator for cleaning material from particles such as oil from sand. A container is provided having upper wall structure with an opening formed therethrough leading to an annular zone extending radially outward from the opening. A cone shaped baffle has an upper open end coupled to the opening and a lower end flaring downward and outward into the container with the lower end of the baffle being located close to but spaced from the side wall of the container. Means is provided for injecting the sand to be cleaned into the upper portion of the container above the baffle. Means is provided for injecting water into the upper portion of the container above the baffle in a direction to cause the sand to swirl downward into the container below the baffle and around the side wall of the container for causing the oil to be removed from the sand. The oil flows upward through the open end of the baffle and through the opening and into the annular zone for removal and the water and sand flow downward through a lower outlet in the container. Gas is injected into the container through the side wall to facilitate the flow of oil upward through the open end of the baffle and through the opening.

20 Claims, 5 Drawing Figures

SEPARATOR

This is a continuation of copending application Ser. No. 387,503, filed June 11, 1982, abandoned.

SUMMARY OF THE INVENTION

It is an object of the present invention to provide a separator for cleaning a material from particles by swirling the particles in a liquid against the side wall of a container in a regular circulation pattern for causing the material to be removed from the particles.

The particles to be cleaned are injected into the upper portion of the container and the liquid is flowed through the container and caused to swirl in the container for causing the separating action. The separated material flows upward in the container through the liquid for removal and the liquid and cleaned particles flow downward and are removed through a lower outlet.

In a further aspect the liquid is injected into the container in a direction to cause the swirling action.

In one embodiment a gas is bubbled upward through the liquid to facilitate the flow of the separated material upward through the liquid.

In another aspect a cone shaped baffle is provided having an upper open end and a lower end flaring downward and outward into said container with the lower end of said baffle being located close to but spaced from the side wall of the container. The particles to be cleaned are injected into the container above the baffle. The liquid is injected into the container above the baffle in a direction to cause the particles to swirl downward into the container below the baffle and around the side wall of the container for causing the material to be removed from the particles. The separated material flows upward through the upper open end of the baffle.

DESCRIPTION OF THE PREFERRED EMBODIMENTS

Figure 1:
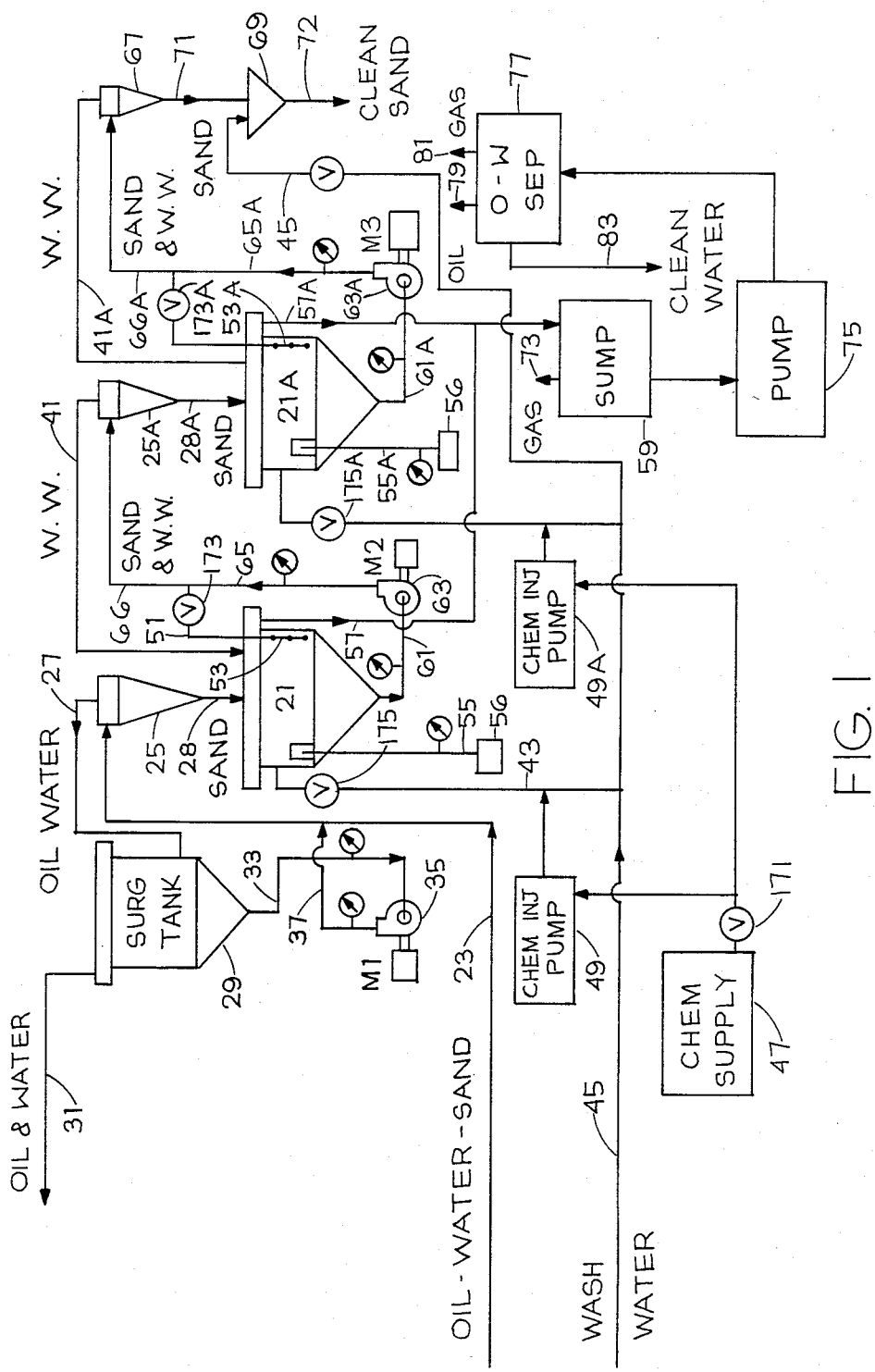
FIG. 1 is a flow diagram of a system employing the separator of the present invention.

Referring now to FIG. 1, there will be described a system for separating sand from an oil-water-sand mixture and for cleaning the oil film from the sand. The system is useful on an off-shore producing platform located in a bay whereby the sand may be cleaned and dumped into the bay without contaminating the water. It is to be understood that the system of FIG. 1 may be used in other areas. The system comprises two identical separators 21 and 21A of the present invention, one of which is shown in detail in FIG. 2.

The oil-water-sand-mixture flows by way of pipe 23 into a plurality of hydro-cyclone 25 (only one of which is shown in FIG. 1) which separates oil and water from sand. The separated oil and water flows by pipe 27 to a surg tank 29 where it is returned to the customer by way of pipe 31. Sand at the bottom of tank 29 is drained off through pipe 33 and pumped by pump 35 back into pipe 23 by way of pipe 37. Pump 35 is driven by motor M1.

The sand from each hydro-cyclone 25 is applied by pipe 28 to the separator 21. Wash water is injected into the top of separator 21 by way of pipe 41 in a direction to cause the sand to be swirled against the wall of the separator 21 for removing the oil film from the sand. Wash water with a surfactant also is injected by pipe 43 into the separator 21 to emulsify the oil film from the sand. The wash water is supplied from pipe 45 and the surfactant is obtained from a chemical supply 47 and injected into pipe 43 by pump 49. The wash water with the surfactant is injected into the separator 21 in a direction to aid the swirl of liquid and sand in the separator. Wash water also is injected into the separator from pipe 51 and high speed jet nozzles 53 to shear the oil film off of the sand. The wash water is injected through nozzles 53 in a direction to aid the swirl of the liquid in the separator 21. A gas such as air is injected into the separator 21 by way of pipe 55 (coupled to a source of gas 56) and bubbled through the liquid to collect the separated oil and to facilitate the flow of the separated oil upward in the separator 21 where it is collected and applied by pipe 57 to a sump 59. Some wash water is used to carry the oil to sump 59. The water and sand from the bottom of the separator 21 is applied by way of pipe 61 to a pump 63 which pumps the water and sand by way of pipes 65 and 65 to a plurality of hydro-cyclone 25A (only one hydro-cyclone 25A is shown in FIG. 1). Pump 63 is driven by motor M2. Pipe 51 applies a portion of the water and sand in pipe 65 back to the separator 21 through nozzles 53. The hydro-cyclones 25A separate water and oil from the sand and applies the separated water and oil back to separator 21 by way of pipe 41. The separated sand from the hydro-cyclones 21A is applied to separator 21A where it is washed again to remove any remaining oil film. Separator 21A is identical to separator 21. The hydro-cyclones 25A are smaller than the hydro-cyclone 25 whereby they also separate finer sand from the oil and water. The separated oil along with wash water is applied by pipe 57A to the sump 59. The water and sand are applied to a plurality hydro-cyclone 67 (only one of which is shown in FIG. 1) which separate the water from the sand. The water is applied back to separator 21A by way of pipe 41A and the sand is applied to a catch pan 69 by way of pipe 71. Water is applied by way of pipe 45 to the catch pan 69 to wash the clean sand from the pan by way of pipe 72. Gas is vented from the sump 59 by vent 73 and the oil and water from sump 59 is pumped by pump 75 to an oil-water separator 77. Oil, gas, and clean water are taken from the separator 77 by way of pipes 79, 81, and 83 respectively.

Figure 2:
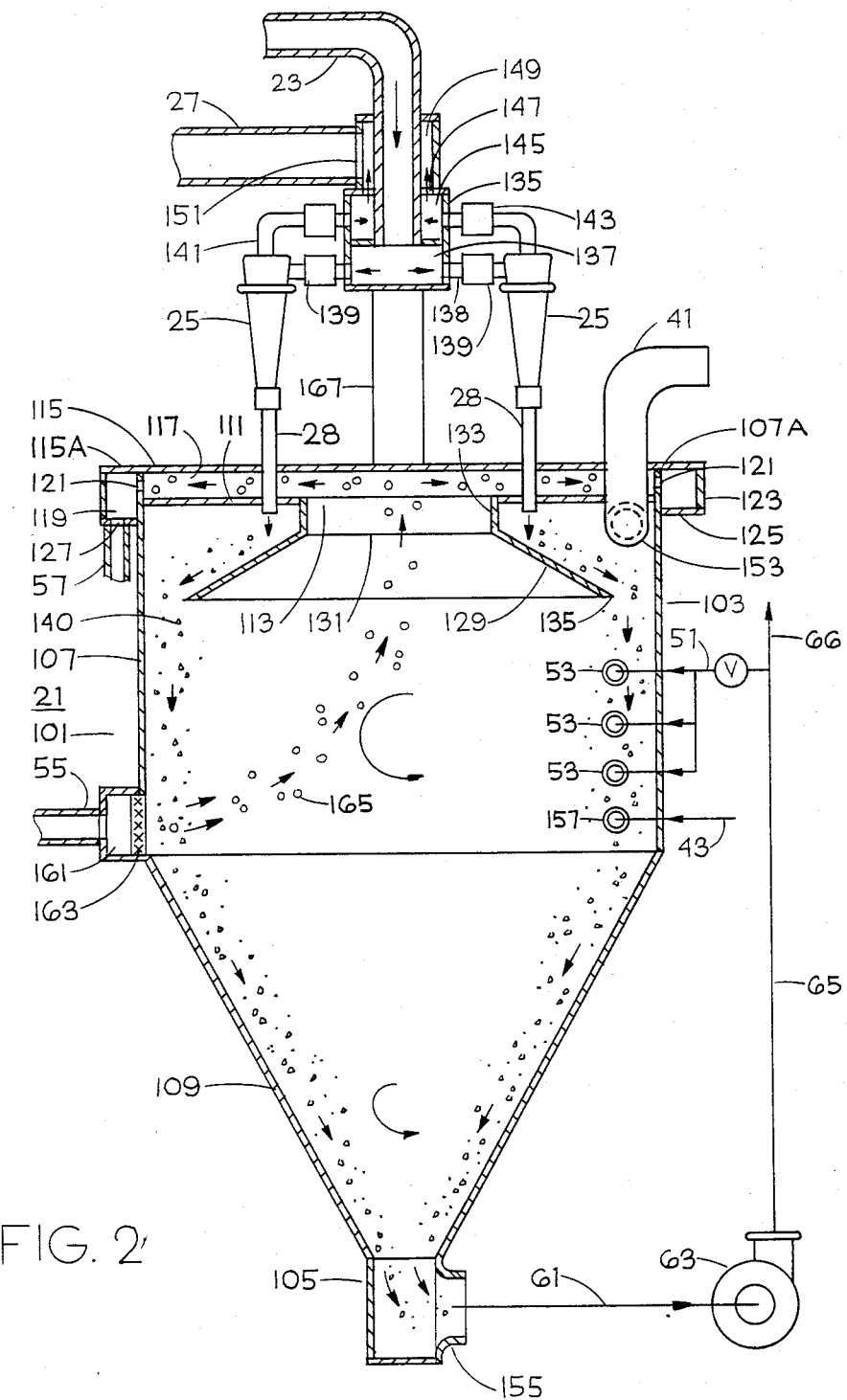
FIG. 2 is a cross-section of the separator of the present invention.

Referring now to FIG. 2, the separator 21 comprises a container 101 having a top end 103, and bottom end 105 and side wall structure comprising a cylindrical portion 107 and a conical portion 109 extending therebetween. Upper wall structure 111 having a round opening 113 formed therethrough is connected to the top portion of cylindrical portion 107. A top wall 115 is connected to the top edge of cylindrical portion 107. The walls 111 and 115 along with outer side wall portion 107A define an annular oil recovery zone 117 extending radially outward from the opening 113. Zone 117 is in fluid communication with an annulus 119 by way of a plurality of small spaced apart apertures 121 formed through wall portion 107A whereby wall portion 107A below the apertures 121 may be defined as a weir. Annulus 119 is formed by the outer portion 115A of wall 115, cylindrical shaped side wall 123 and bottom wall 125. Pipe 57 is connected to the annulus 119 by way of an aperture 127 formed through wall 125.

A cone shaped baffle 129 having an upper open end 131 is coupled to the opening 113 by way of a cylindrical shaped wall 133. The cone shaped baffle 129 flares downward and outward such that its lower edge 135 is located close to but spaced from the container wall 107.

Pipe 23 is connected to a manifold 135, which is coupled to a plurality of hydro-cyclones 25. The oil-water-sand mixture flows from pipe 23 into the hydro-cyclones 25 by way of chamber 137 tubes 138, and valves 139. The separated sand (underflow) from the hydro-cyclones 25 is injected by pipes 28 into the portion of the container 101 above the baffle 129. In FIG. 2, the sand is illustrated at 140. The oil and water (overflow) from the hydro-cyclones is applied to pipe 27 by way of tubes 141, valves 143 annular chamber 145, annular opening 147, annular chamber 149 and opening 151.

Figure 3:
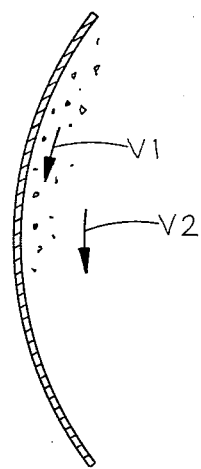
FIG. 3 is a partial cross-section of the separator of FIG. 2 illustrating sand and water flow.
Figure 4:
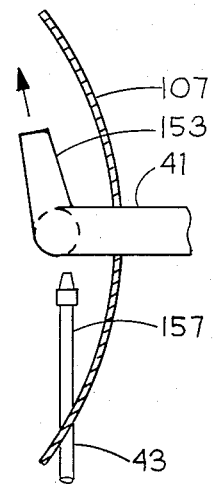
FIG. 4 is a partial cross-section of the separator of FIG. 2 illustrating the injection of water into the separator.

Pipe 41 has a nozzle 153 connected to its end in the upper portion of the container as shown also in FIG. 4. Nozzle 153 is located to inject the water generally tangentially to the wall 107 of the container whereby the water is swirled around the wall 107 of the container. In FIGS. 2 and 4 as viewed from above the swirling action is counter clockwise. This causes the sand 140 to swirl downward and outward in the container whereby it passes between the lower edge 135 of the baffle 129 and the wall 107. Below the baffle 129, the swirling action of the water causes the sand to swirl against the side wall 107, 109 of the container and as it moves downward in the container, out of a lower outlet 153 with the water. As the sand is swirled by the water against the container wall a regular circulation pattern is established with the sand rolling or dragging against the wall. This sets up a two speed flow with the sand particles flowing at a velocity V1 and the water flowing at a faster rate V2 as illustrated in FIG. 3. Thus the fluid washes the sand and removes the oil film from the sand. The regular circulation pattern insures that all sand particles of the same size or the same settling rate will be washed equally.

Water and a surfactant also is injected through pipe 43 by way of a nozzle 157 which is located in the container to inject the water generally tangentially (counter clockwise) to the wall 107 whereby it aids the counter clockwise swirl of the water injected from nozzle 153. The surfactant emulsifies the oil and thus facilitates removal of the oil film from the sand. In addition high speed jet nozzles 53 located in the container are coupled to pipe 51 to inject the return liquid from pipe 51 at a high velocity to shear the oil film from the sand. The nozzles 53 are located to inject the return liquid generally tangentially (as viewed from above, counter clockwise) to the wall whereby it aids the counter clockwise swirl of the liquid in the container. The nozzles 53 point in the same direction as nozzle 157 but are not shown in FIG. 4.

Gas from the pipe 55 is injected into the container below the baffle 129 at a position where the sand is swirled in a regular pattern against the wall of the container. Pipe 55 is coupled to a chamber 161 which is in fluid communication with the interior of the container by way of a small pore material 163 which causes the gas injected through pipe 55 to be formed into small bubbles. The separated oil attaches to these bubbles whereby the bubbles act as a collector and rise through the liquid with the oil as shown at 165 into the oil removal zone 117. The oil flows through the small apertures 121 into the annulus 119 and is drained off through pipe 57.

Figure 5:
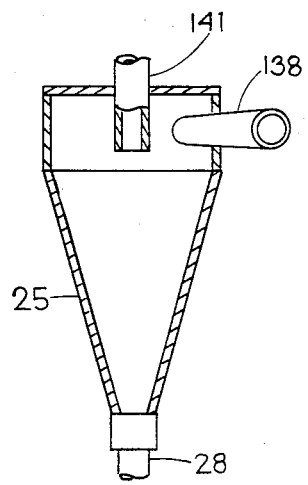
FIG. 5 is a cross-section of a hydro-cyclone.

In one embodiment the number of hydro-cyclones 25 coupled to separator 21 may be 12 or 18. The purpose of structure 167 is to support the manifold 135 and the hydro-cyclones 25. A typical hydro-cyclone is shown in FIG. 5. For a typical hydro-cyclone, about 95% of the fluid injected goes up tube 141 as water and oil and about 5% goes down out of tube 28 as oil water and sand. Of the 5% going out of tube 28, about 1.9% is sand and about 3.1% is water and oil. As one example of fluid flow, 600 gallons per minute of fluid (gpm) flows through pipe 23; 570 gpm of fluid flows through pipe 27; 30 gpm of fluid flows out of the lower outlets 28 of hydro-cyclones 25, 800 gpm of fluid flows out of outlet 155 of container 21, 200 gpm of fluid flows through return pipe 51; 600 gpm of fluid flows through pipe 66, and 570 gpm of fluid flows through return pipe 41. In one embodiment, the cylindrical portion 107 of the container may have an inside diameter 7 feet and the maximum diameter of cone 129 may be 6½ feet. The gas employed to form the bubbles 140 may be air, nitrogen, or produced gas.

In order to minimize cost, surfactant may not be injected whereby cleaning of the oil film from the sand is accomplished only by the swirling action and the shear action from nozzles 53. In this instance valve 171 is closed and pumps 49 and 49A are shut down.

As a further alternative, the shearing action from nozzles 53 may not be utilized for the cleaning action. In this instance, valves 173 and 173A will be closed and only 600 gpm will be allowed to flow out of outlets 155 (of separators 21 and 21A) and pipes 61 and 61A. Cleaning action thus is accomplished only by the swirling action and with the use of the surfactant.

As another alternative, the cleaning action may be obtained only from the swirling action created by nozzles 153 and 157. In this alternative, valve 171 will be closed; pumps 49 and 49A shut down; valves 173 and 173A closed; and only 600 gpm will be allowed to flow out of outlets 155 (of separators 21 and 21A) and pipes 61 and 61A.

As a still further alternative, the gas bubbles may not be employed for oil film collecting purposes. In this alternative, valves 175 and 175A will be closed. The separated oil will rise to the top to the removal zone 117 since its density is less than that of the water.

Although the system of FIG. 1 employs two separators of the present invention, it is to be understood that only one separator may be employed.

Although the separator of the present invention has been described as being used for separating oil film from sand, it is to be understood that it could be used for other separation purposes such as separating metallic sulfates from ground ore. The ground ore for example may be copper ore whereby copper sulfate is to be removed from the ore. In the embodiment wherein the separator 21 is employed for separating metallic sulfate from a ground ore, the use of gas bubbles for collection of the separated sulfates will be required. By use of proper chemicals, ore component other than metallic sulfates may be separated from the ore.

I claim:

1. A system for cleaning material from solid particles, comprising:

a container having a top end, a bottom end and side wall structure extending between said top end and said bottom end, upper wall structure having an opening formed therethrough leading to an upper zone, means for separating a liquid material and solid particles from a mixture of the solid particles and the liquid material, after separation, the solid particles having a film of the material thereon, particle injecting means for injecting the separated solid particles to be cleaned into the top portion of said container radially outward from said opening, means separate from said particle injecting means for injecting a liquid into said container in a direction to cause the solid particles to swirl around and against said side wall structure of said container for causing the material to be removed from the solid particles, whereby the material flows upward through said opening and into said upper zone and liquid and solid particles flow downward to the bottom end of said container, an outlet coupled to said upper zone for removing the material from said upper zone, and a lower outlet coupled to the bottom end of said container for removing the solid particles and liquid from the bottom end of said container.

2. The system of claim 1, comprising:

means for injecting a gas into said container for facilitating the flow of the material upward through said opening.

3. A system for cleaning material from solid particles, comprising:

a container having a top end, a bottom end, and side wall structure extending between said top end and said bottom end, upper wall structure having an opening formed therethrough leading to an upper zone, means for separating a liquid material and solid particles from a mixture of the solid particles and the liquid material, after separation, the solid particles having a film of the material thereon, particle injecting means for injecting the separated solid particles to be cleaned into the top portion of said container radially outward from said opening, means separated from said particle injecting means for flowing a liquid through said container, means for causing the liquid and solid particles to swirl around and against said side wall structure of said container for causing the material to be removed from the solid particles, whereby the material flows upward through said opening and into said upper zone and liquid and solid particles flow downward to the bottom end of said container, an outlet coupled to said upper zone for removing the material from said upper zone, and an outlet coupled to the bottom end of said container for removing the solid particles and liquid from the bottom end of the container.

4. The system of claim 3, comprising:

means for injecting a gas into said container for facilitating the flow of the material upward through said opening.

5. A system for cleaning material from solid particles, comprising:

a container having a cylindrical shaped upper portion, a top end, and a bottom end, upper wall structure having an opening formed therethrough leading to an annular zone extending radially outward from said opening.

said opening having a cross-sectional area less than the cross-sectional area of said cylindrical shaped upper portion of said container, a cone shaped baffle having an upper open end coupled to said opening and a lower end flaring downward and outward into said cylindrical shaped upper portion of said container with the lower end of said baffle being located close to but spaced from the side wall of the cylindrical shaped upper portion of said container, means for injecting the solid particles to be cleaned into said cylindrical shaped upper portion of said container above said baffle, means for injecting a liquid into said container above said baffle in a direction to cause the particles to swirl downward into said container below said baffle and around and against the side wall of said cylindrical shaped upper portion of said container for causing the material to be removed from the solid particles, whereby the material flows upward through said open end of said baffle and through said opening and into said annular zone and the liquid and solid particles flow downward to the bottom end of said container, an upper outlet coupled to the outer portion of said annular zone for removing the material from said annular zone, and a lower outlet coupled to the bottom end of said container for removing the solid particles and liquid from the bottom end of said container.

6. The system of claim 5, comprising:

means for injecting a liquid into said container below said baffle and in the same direction in which the liquid is injected into said container above said baffle.

7. The system of claims 5 or 6, comprising:

means for injecting a gas into said container below said baffle for facilitating the flow of the material upward through said open end of said baffle and through said opening.

8. The system of claim 6 wherein:

said solid particles comprise sand, said material to be cleaned from the sand comprises oil, said liquid injected into said container above and below said baffle comprises water and a surfactant.

9. The system of claim 5, wherein:

said container comprises a cone shaped lower portion having its greater diameter portion coupled to the lower end of said cylindrical shaped upper portion and its smaller diameter portion coupled to said lower outlet.

10. A system for cleaning material from solid particles, comprising:

a container having a top end, a bottom end, and side wall structure extending between said top end and said bottom end, upper wall structure having an opening formed therethrough leading to an annular zone extending radially outward from said opening, a cone shaped baffle having an upper open end coupled to said opening and a lower end flaring downward and outward into said container with the lower end of said baffle being located close to but spaced from said side wall structure, means for injecting the solid particles to be cleaned into the upper portion of said container above said baffle, means for injecting a liquid into said container above said baffle in a direction to cause the solid particles to swirl downward into said container below said baffle and around and against said side wall structure for causing the material to be removed from the solid particles, whereby the material flows upward through said open end of said baffle and through said opening and into said annular zone and the liquid and solid particles flow downward to the bottom end of said container, an upper outlet coupled to the outer portion of said annular zone for removing the material from said annular zone, and a lower outlet coupled to the bottom end of said container for removing the solid particles and liquid from the bottom end of said container.

11. The system of claim 10, comprising:
means for injecting a liquid into said container below said baffle and in the same direction in which the liquid is injected into said container above said baffle.

12. The system of claims 10 or 11, comprising:
means for injecting a gas into said container below said baffle for facilitating the flow of the material upward through said open end of said baffle and through said opening.

13. The system of claim 10, wherein:
the solid particles to be cleaned comprise sand,
the material to be cleaned from the sand comprises oil,
means for applying a mixture comprising oil and sand to a separator for separating the oil from the sand, after separation, the sand having a film of oil thereon,
said means for injecting the solid particles into the upper portion of said container injects the sand from said separator into the upper portion of said container above said baffle between its upper end and its lower end,
said liquid injected into said container above said baffle comprises water.

14. The system of claim 10, wherein:
said container comprises a cone shaped lower portion having its greater diameter portion coupled to the lower end of said cylindrical shaped upper portion and its smaller diameter portion coupled to said lower outlet.

15. The system of claim 14, wherein:
the solid particles to be cleaned comprise sand,
the material to be cleaned from the sand comprises oil,
means for applying a mixture comprising oil and sand to a separator for separating the oil from the sand, after separation, the sand having a film of oil thereon,
said means for injecting the solid particles into the upper portion of said container injects the sand from said separator into the upper portion of said container above said baffle between its upper end and its lower end,
said liquid injected into said container above said baffle comprises water.

16. The system of claim 15, wherein:
said means for injecting the solid particles into the upper portion of said container injects the sand from said separator into the upper portion of said container downward and non-tangentially to said side wall structure of said container.

17. A system for cleaning material from solid particles, comprising:
a container having a top end, a bottom end and side wall structure extending between said top end and said bottom end,
upper wall structure having an opening formed therethrough leading to an upper zone,
baffle means extending downward from said opening and outward below said upper wall structure,
particle injecting means for injecting the solid particles to be cleaned into the top portion of said container radially outward from said opening and onto the upper surface of said baffle means whereby said baffle means directs the solid particles outward toward said side wall structure of said container,
means separate from said particle injecting means for injecting a liquid into said container in a direction to cause the solid particles to swirl around and against said side wall structure of said container for causing the material to be removed from the solid particles, whereby the material flows upward through said opening and into said upper zone and liquid and solid particles flow downward to the bottom end of said container,
an outlet coupled to said upper zone for removing the material from said upper zone, and
a lower outlet coupled to the bottom end of said container for removing the solid particles and liquid from the bottom end of said container.

18. The system of claim 17, wherein:
said container comprises a cylindrical shaped upper portion and a cone shaped lower portion having its greatest diameter portion coupled to the lower end of said cylindrical shaped upper portion and its smaller diameter portion coupled to said lower outlet such that the solid particles and liquid enter said outlet from the bottom end of said container.

19. A system for cleaning material from solid particles, comprising:
a container having a top end, a bottom end, and side wall structure extending between said top end and said bottom end,
upper wall structure having an opening formed therethrough leading to an upper zone,
particle injecting means for injecting the solid particles to be cleaned into the top portion of said container radially outward from said opening,
means separate from said particle injecting means for injecting a liquid into said container, in a direction to cause the liquid and solid particles to swirl around and against said side wall structure of said container for causing the material to be removed from the solid particles, whereby the material flows upward through said opening and into said upper zone and liquid and solid particles flow downward to the bottom end of said container,
an outlet coupled to said upper zone for removing the material from said upper zone, and
an outlet coupled to the bottom end of said container for removing the solid particles and liquid from the bottom end of the container,
said container comprising a cone shaped lower portion having its smaller diameter portion coupled to said lower outlet such that the solid particles and liquid enter said outlet from the bottom end of said container.

20. A method of cleaning material from solid particles in a container having a top end, a bottom end, side wall structure extending between said top end and said bottom end, upper wall structure having an opening formed therethrough leading to an upper zone, an upper outlet coupled to said upper zone, and a lower outlet coupled to the bottom end of said container, comprising the steps of:

injecting the solid particles to be cleaned into the top portion of said container radially outward of said opening, injecting a liquid into said container in a direction to cause the solid particles to swirl around and against said side wall structure of said container for causing the material to be separated from the solid particles, flowing the separated material upward through said opening and into said upper zone and flowing said liquid and solid particles downward to the bottom end of said container, flowing the separated material from said upper zone through said upper outlet, and flowing the solid particles and liquid at the bottom end of said container through said lower outlet.

* * * * *